United States Patent [19]

Hegemann et al.

[11] Patent Number: 4,576,803

[45] Date of Patent: Mar. 18, 1986

[54] METHOD OF PRODUCING CALCIUM SULFATE DIHYDRATE IN CONNECTION WITH THE DESULFURIZATION OF FLUE GASES

[75] Inventors: Karl-Rudolf Hegemann, Essen; Helmut Weissert, Bochum; Jürgen Laimkühler, Essen, all of Fed. Rep. of Germany

[73] Assignee: Gottfried Bischoff Bau kompl. Gasreinigungs- und Wasserrückkuhlanlagen GmbH & Co. Kommanditgesellschaft, Essen, Fed. Rep. of Germany

[21] Appl. No.: 559,916

[22] Filed: Dec. 9, 1983

[30] Foreign Application Priority Data

Dec. 10, 1982 [DE] Fed. Rep. of Germany ....... 3245754

[51] Int. Cl.$^4$ ............................................. C01B 17/00
[52] U.S. Cl. .................................. 423/242; 423/166; 423/555
[58] Field of Search .......... 423/242 A, 242 R, 244 A, 423/166, 555; 422/62

[56] References Cited

U.S. PATENT DOCUMENTS

| | | | |
|---|---|---|---|
| 2,080,779 | 5/1937 | Lessing | 423/242 |
| 2,090,142 | 8/1937 | Nonhebel et al. | 423/242 |
| 2,090,143 | 8/1937 | Nonhebel et al. | 423/242 |

*Primary Examiner*—Gregory A. Heller
*Attorney, Agent, or Firm*—Karl F. Ross; Herbert Dubno

[57] ABSTRACT

A scrubber for flue gases from a fossil-fired power plant in which calcium sulfate dihydrate is produced by recirculating the scrubbing water suspension containing lime and introducing oxygen into the sump collection, has a discontinuously operated pump which withdraws the suspension for recovering of the solid product only discontinuously so as to maintain the solids concentration between 40 and 130 g/l.

3 Claims, 1 Drawing Figure

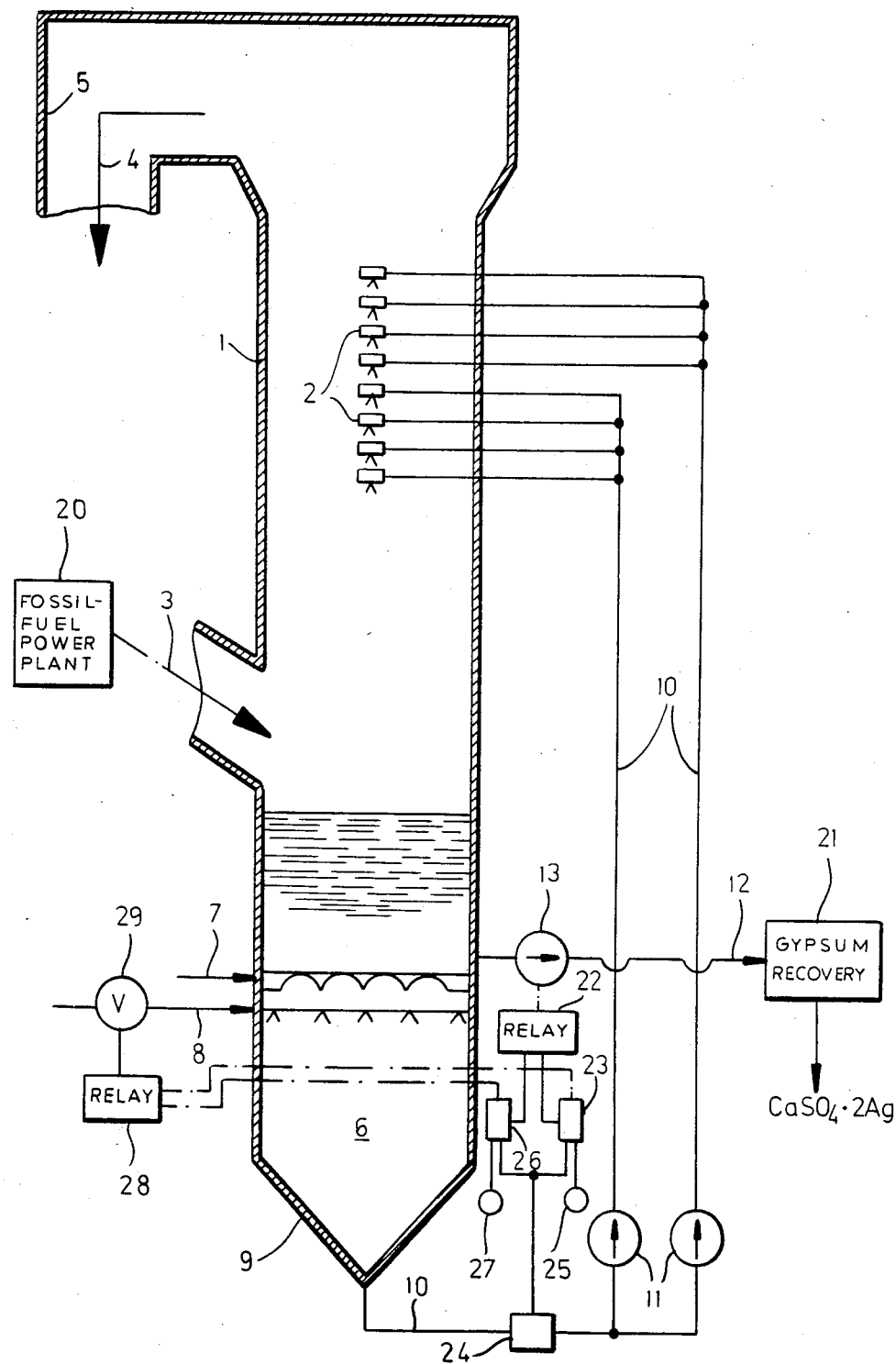

even though scrubbing liquid from the column is continuously withdrawn from the cycle for further processing, e.g. for the recovery of the gypsum product.

METHOD OF PRODUCING CALCIUM SULFATE DIHYDRATE IN CONNECTION WITH THE DESULFURIZATION OF FLUE GASES

CROSS REFERENCE TO RELATED APPLICATIONS

This application is related to the commonly assigned copending application Ser. No. 546,486 filed Oct. 28, 1983 now U.S. Pat. No. 4,503,020 by Helmut Weissert and Karl-Rudolf Hegemann, two of the present joint inventors, and disclosing and claiming subject matter which is also to be found in the corresponding German application No. P 32 40 317.8 filed Oct. 30, 1982.

That application, in turn, refers to still earlier applications including the following:

Ser. No. 402,570 filed July 28, 1982, abandoned
Ser. No. 515,919 filed July 20, 1983, now U.S. Pat. No. 4,515,754 and
Ser. No. 493,984 filed May 12, 1983 now U.S. Pat. No. 4,539,184.

Reference may be had to the following additional applications in whole or in part, commonly owned with the present case:

Ser. No. 405,603 filed Aug. 5, 1982,
Ser. No. 321,071 filed Nov. 13, 1981, now U.S. Pat. No, 4,427,183, and
Ser. No. 327,500 filed Dec. 4, 1981, now U.S. Pat. No. 4,415,142.

Reference may be had as well to the below-listed United States patents, their German counterparts and the patents cited in these documents or listed in the files thereof:

U.S. Pat. No. 4,375,439,
U.S. Pat. No. 4,316,727,
U.S. Pat. No. 4,218,241,
U.S. Pat. No. 4,145,193,
U.S. Pat. No. 4,052,042, and
U.S. Pat. No. 4,007,025.

FIELD OF THE INVENTION

The present invention relates to a method of producing calcium sulfate dihydrate in connection with the desulfurization of flue gases and especially the desulfurization of the flue gases of power plant boilers of the fossil-fuel-fired type.

BACKGROUND OF THE INVENTION

It is known to scrub flue gases from fossil-fuel-fired combustion, e.g. from fossil-fuel power plant boilers, with a scrubbing suspension containing in addition to water one or more alkaline-earth materials which can react with the sulfur oxides in the flue gases and with sulfur oxides which are formed in the scrubbing tower to produce calcium sulfate dihydrate.

In general, lime can be added to the scrubbing solution which can be recirculated from the sump of the scrubbing tower to the spray heads disposed above this sump so that the spray or scrubbing liquid passes in counterflow to the flue gases to be scrubbed.

The term "lime" as used herein is intended to refer to calcium oxide, calcium hydroxide and even calcium carbonate, since all react with the sulfur oxides to produce calcium sulfate which is in suspension in the scrubbing liquid in the sump and which can be precipitated from the scrubbing liquid or settled therefrom to enable recovery of the calcium sulfate.

In the recent applications Ser. No. 515,919 and Ser. No. 493,984 we, among others, have described processes in which oxygen in the form of air, oxygen-enriched air or technical purity oxygen, can be introduced into the sump of the scrubbing column at least in part to ensure an oxidation of sulfite to sulfate whereby the solids in the suspension which is produced from the scrubbing operation can be predominately calcium sulfate dihydrate. The calcium sulfate dihydrate which is subsequently recovered from the sump suspension is a valuable product since it can be converted into a building material and frequently can be recovered as a usable gypsum product directly so that it need not be disposed of and thus does not create an environmental hazard. In this respect, reference may be had to Ser. No. 546,486 filed Oct. 28, 1983 now U.S. Pat. No. 4,503,020.

In this later application a process is described in which the sump liquid, i.e. the suspension recovered by scrubbing the gas, is recirculated from the sump to the spray heads. This ensures a predetermined mean residence time for the scrubbing liquid in the column even though scrubbing liquid from the column is continuously withdrawn from the cycle for further processing, e.g. for the recovery of the gypsum product.

The scrubber is designed generally for the maximum expected flue gas volume and maximum expected sulfur dioxide concentration in the flue gas.

In practice, while the scrubbing system is designed to be able to deal with these maxima, the sulfur content of the coal is usually less than the maximum permissible sulfur content and the power demand in the plant is generally less than that which would give rise to the maximum flue gas volume so that normal operations take place at levels well below these maxima.

Furthermore, the fluctuations in the flue gas volume and sulfur content are substantial, the quantities of sulfur dioxide which must be removed vary sharply and naturally the amount of calcium sulfate dihydrate which is recovered in the scrubbing liquid varies sharply with time.

It has been a practice in the past to maintain the concentration of the liquids, namely, the calcium sulfate dihydrate, in the recirculated scrubbing liquid substantially constant and to withdraw this scrubbing liquid substantially continuously for processing, i.e. gypsum recovery.

This, however, requires continuous control of the withdrawal pump and, in turn, requires the use of an expensive control circuit, operating with great precision and a variable displacement pump, e.g. a pump whose speed could be controlled and which generally was of the displacement type. Such pumps were subjected to considerable wear.

Furthermore, the downstream apparatus, i.e. the means for processing the suspension, had to be compensatorily designed to accommodate the carefully controlled withdrawal of the suspension from the cycle and thus the further processing of the suspension to yield the calcium sulfate dihydrate was required to match the variable rate of continuous outflow from the cycle. This resulted in variations in the quality of the calcium sulfate dihydrate or gypsum which was recovered and frequently gave rise to a poor quality product.

OBJECTS OF THE INVENTION

It is the principal object of the present invention to provide a process for the production of calcium sulfate dihydrate in conjunction with the desulfurization of flue gases from power plant boilers and the like, whereby the disadvantages of earlier systems are obviated.

Another object of this invention is to provide a method for the purpose described which allows a simplification of the apparatus which is used and yields the final product more reliably and with fewer problems than heretofore.

It is also an object of this invention to provide an improved method of operating an apparatus for producing calcium sulfate dihydrate as described or for scrubbing flue gases to produce calcium sulfate dihydrate.

Another object of this invention is to provide an improved apparatus for scrubbing flue gases and producing at least a suspension from which calcium sulfate dihydrate can be derived.

SUMMARY OF THE INVENTION

These objects and others which will become more readily apparent hereinafter are attained, in accordance with the present invention, which provides for the scrubbing of fossil-fuel flue gases with a scrubbing liquid containing lime, introducing oxygen into the scrubbing liquid as described to oxidize the sulfite to sulfate and produce calcium sulfate dihydrate in a suspension of the scrubbing liquid, recycling the scrubbing liquid suspension from the sump of the column to the scrubbing of flue gases in the column, and discontinuously withdrawing the scrubbing suspension from the column so as to maintain a suspension concentration in the sump and in the recirculated scrubbing liquid between substantially 40 grams per liter and substantially 130 g/l.

Advantageously, the withdrawal pump, which is discontinuously operated, is activated upon the increase in solids concentration in the suspension to a maximum within this range and is deactivated upon the fall of the solids concentration to a minimum value in this range.

The maximum and minimum values preferably are selected so that the solids concentration in the scrubbing water suspension is maintained between 60 and 100 g/l.

According to a feature of the invention, means is provided to respond to the solids concentration in the suspension for controlling this pump.

The maximum value for control of the pump can be the 130 g/l mentioned previously, but preferably is 100 g/l, while the minimum value can be 40 g/l but preferably is 60 g/l. This ensures that the concentration of solids in the scrubbing water can increase by recirculation to the maximum value, the pump being then activated to withdraw suspension (with addition of make-up water and additional quantities of lime) until the suspension drops to the minimum value, whereupon extraction of the suspension ceases, while recycling continues and, of course, make-up water addition is terminated to allow the suspension to build up again to the maximum value.

This process has numerous advantages. Firstly, it enables the use of an impeller or centrifugal pump rather than a positive displacement pump and hence a pump which is less susceptible to wear than the positive displacement pump and permits the complex precision controls hitherto required to be replaced by simple on-off circuitry.

Secondly, the dewatering provided downstream of the scrubber need not have its throughput continuously controlled in response to the feed, but also can be of the start-stop type so that wear is minimized.

Thirdly, with the claimed method, the mean residence time of a calcium sulfate dihydrate or gypsum crystals in the circulation is substantially increased especially when the system operates at less than full capacity, so that very large to light and easily dewatered crystals are obtained and are produced. These large crystals are of considerable importance because in the production of hemihydrate subsequently they enable the detrimental chlorides to be readily washed out.

Furthermore, with the method of the invention, the degree of utilization of the neutralizing agent, e.g. limestone or milk of lime, is improved and thus losses can be reduced while the gypsum quality is increased because less limestone is found in the recovered product.

The circulation of the suspension, which forces the crystal growth, also has the function of storage of the suspension so that the dewatering facilities and the gypsum-production facilities downstream of the scrubber can be dimensioned somewhat smaller than would be the case if they were required to operate continuously at the maximum loading output of the suspension.

Even the degree of desulfurization of the flue gases can be improved since during the intervals in which removal of the suspension or slurry does not occur, there may be an excess of the neutralization medium or alkali in the scrubber which can be maintained until shortly before the beginning of a new suspension-withdrawal phase.

BRIEF DESCRIPTION OF THE DRAWING

The above and other objects, features and advantages of the present invention will become more readily apparent from the following description, reference being made to the accompanying drawing in which the sole FIGURE is a diagrammatic vertical section of a scrubbing column for carrying out the method of the invention.

SPECIFIC DESCRIPTION AND EXAMPLE

In FIG. 1 there is shown a source 20 which can be a fossil-fired power plant and from which the flue gases are fed at 3 into the scrubbing column 1. Within the scrubbing column these gases rise and pass in counterflow to a spray of a suspension containing, for example, calcium carbonate or a solution of lime in which calcium sulfate dihydrate as previously formed is suspended, the suspension being discharged from the spray heads 2 so that the suspension collects in the sump 6.

The heads 2 may be swirl nozzles and baffles may be provided if desired to ensure an intimate contact between the flue gases and the scrubbing suspension.

Flue gases which had been introduced substantially midway of the height of the scrubbing column are thus freed from sulfur oxides and are discharged as represented by the arrow 4 through an outlet 5 from the top of the column, e.g. to a stack.

The bottom 9 of the sump is provided with a manifold pipe 10 which communicates with a plurality of pumps 11, only two of which have been shown in the drawing although a greater number can be used as described in the aforementioned copending application Ser. No. 546,486 now U.S. Pat. No. 4,503,020. These pumps 11 recirculate the scrubbing suspension to the heads 2. Within the sump 6, oxygen, e.g. in the form of air, can be introduced at 7 and the make-up water and the lime, e.g. as milk of lime, can be introduced at 8.

Reference may be had in this regard to the copending applications Ser. Nos. 515,919 and 493,984.

As a result and as described in Ser. No. 546,486 now U.S. Pat. No. 4,503,020 the calcium compound reacts with the sulfur oxides to form calcium sulfate and calcium sulfite and the sulfite is oxidized to the sulfate so that the sump suspension is a suspension of the calcium sulfate dihydrate in water. It is this suspension which is recirculated by the pumps 11.

At appropriate intervals above the air inlet 7, a pipe 12 provided with a pump 13 can withdraw portions of the suspension to feed the suspension to a dewatering plant at which gypsum is recovered as described in application Ser. No. 546,486 now U.S. Pat. No. 4,503,020. This recovery unit has been represented at 21 in the drawing.

The pump 13 is operated by an on-off controller at the relay 22 which can resume an on-signal from a comparator 23 when a sensor 24 of the turbidity of the suspension signals the attainment of a solids concentration of a maximum value of, say, at 30 g/l (preferably 100 g/l). The comparator may have a set point input 25 enabling the setting of the maximum value.

The relay 22 open -circuits the motor 13 when the comparator 26 responds to an input from the sensor 27 to signal a fall in the solids concentration of the suspension to a minimum value of, say, 40 g/l, (preferably 60 g/l). A set point input for the minimum value is provided at 27. The comparators 23 and 26 also provide operating signals for an on-off relay 28 controlling a valve 29 through which the make-up water is added to the system so that the make-up water is added and during or upon removal of suspension via the pump 13, thereby allowing the volume of the scrubbing liquid to be maintained and the solids concentration to be built up once it has been reduced.

Consequently, the suspension is only extracted when the maximum concentration is reached, until this concentration is reached the system operates with continuous build-up of the solids concentration and the solids concentration remains within the prescribed range for the scrubbing operation.

We claim:

1. A method of operating a scrubbing column for the scrubbing and desulfurizing of flue gas from a fossil-fired power plant, comprising the steps of:
   (a) preparing a scrubbing liquid by introducing lime and water into the sump of a scrubbing column containing a suspension of calcium sulfate dihydrate in the scrubbing water;
   (b) scrubbing and desulfurizing said flue gas by passing it through a portion of said column above said sump in counterflow to scrubbing liquid which collects in this sump while introducing oxygen into the liquid in the sump;
   (c) continuously recirculating the scrubbing liquid from this sump to the scrubbing of flue gas above said sump;
   (d) detecting the solids concentration of said suspension;
   (e) commencing at intervals a withdrawal of said suspension from said sump upon the detection of a solids concentration of said suspension at a maximum value in the range of 40 to 130 g/l;
   (f) terminating the withdrawal upon the the solids concentration in said suspension falling to a minimum value in said range;
   (g) adding make-up water to the suspension of said sump; and
   (h) processing the withdrawn suspension to recover calcium sulfate dihydrate therefrom.

2. The method defined in claim 1 wherein said maximum value is 100 g/l.

3. The method defined in claim 1 wherein said minimum value is 60 g/l.

* * * * *